United States Patent [19]

Murphy, Sr. et al.

[11] Patent Number: 4,583,014
[45] Date of Patent: Apr. 15, 1986

[54] DYNAMOELECTRIC MACHINE WITH A ROTOR HAVING A SUPERCONDUCTING FIELD WINDING AND DAMPER WINDING

[75] Inventors: John H. Murphy, Sr., Churchill Borough; James H. Parker, Jr., Penn Hills, both of Pa.

[73] Assignee: Westinghouse Electric Corp., Pittsburgh, Pa.

[21] Appl. No.: 654,700

[22] Filed: Sep. 26, 1984

[51] Int. Cl.[4] ............................................. H02K 9/00
[52] U.S. Cl. .................................... 310/52; 310/40 R
[58] Field of Search ................... 310/10, 40 R, 52, 54, 310/61, 64, 65, 165, 198, 203, 206, 207, 184, 68 R; 318/318, 254

[56] References Cited

U.S. PATENT DOCUMENTS

| | | | |
|---|---|---|---|
| 3,670,187 | 6/1972 | Thum | 310/10 |
| 3,679,920 | 7/1972 | MacNab | 310/10 |
| 3,764,835 | 10/1973 | Luck | 310/10 |
| 3,781,578 | 12/1973 | Smith | 310/61 |
| 3,934,163 | 1/1976 | Mailfert | 310/10 |
| 3,999,091 | 12/1976 | Kirtley | 310/52 |
| 4,058,746 | 11/1977 | Mole | 310/52 |
| 4,152,609 | 5/1979 | Cooper | 310/52 |

OTHER PUBLICATIONS

Journal of Applied Physics, vol. 45, No. 2; 02/1974; W. J. Carr Jr., pp. 929-938.
IEEE Transactions on Power Apparatus & Systems, vol. PAS-90, No. 2; 03/04-1971; pp. 620-627.

*Primary Examiner*—R. Skudy
*Attorney, Agent, or Firm*—G. H. Telfer

[57] ABSTRACT

A superconducting generator with a normally conducting armature winding is provided with a rotor having a superconducting field winding and a superconducting damper winding with the damper winding on a quadrature axis in relation to the field winding and located radially interior of the field winding to result in minimal spacing of the field winding and the armature winding and still achieving a high degree of fault worthiness.

4 Claims, 3 Drawing Figures

DYNAMOELECTRIC MACHINE WITH A ROTOR HAVING A SUPERCONDUCTING FIELD WINDING AND DAMPER WINDING

BACKGROUND OF THE INVENTION

This invention relates to dynamoelectric machines such as generators which have a rotor with superconducting windings.

Background to the present invention is contained in Kirtley, Jr. et al. U.S. Pat. No. 3,999,091, Dec. 21, 1976, which relates to the use of a wound damper-shield winding in a superconducting rotor. As will be more apparent from the discussion hereinafter, the present invention uses a "damper" winding but not a "damper-shield" winding as in the patent, the respective windings being located differently in relation to the field winding. Cooper et al. U.S. Pat. No. 4,152,609, May 1, 1979, shows a combined damper and shield in the form of a composite metal shell.

Superconducting generators are generally characterized by having a normally conductive air gap winding on the stator and a D.C. superconducting field winding on the rotor. While it has been recognized that it is desirable to minimize the distance between the stator armature winding and the field winding for the purpose of achieving the highest machine rating possible for the physical size of the machine, practical considerations have impeded the achievement of an extremely close spacing. These practical considerations include the need to shield the field winding from A.C. fields created by the armature winding under unbalanced and fault conditions and the need to damp mechanical oscillations which occur during a period after the occurrence of a fault. Consequently, machine designs have included a number of continuous metallic shells to shield the field winding from the A.C. fields of the armature winding under unbalanced and fault conditions and to damp mechanical oscillations which occur during the post fault period. Designers have used metallic shields because a superconductor, though lossless under D.C. conditions, has a hysteresis loss under A.C. conditions and such losses in superconducting windings must be multiplied by the specific power of refrigeration on the order of 1000 in order to reflect the true electrical consumption. That is, the expense of refrigerating the D.C. field winding to ensure that it could withstand all contemplated fault and steady-state conditions would be so great that it has been generally preferred to use metallic shells despite the fact that they tend to reduce the power density from what would be obtainable if it were not necessary to design for fault conditions.

In addition to have the benefit of past experience in superconducting generator design, present day designers also have available to them an increasingly thorough understanding of A.C. losses in superconductors so that they can be calculated with greater confidence as represented by the publications of W. J. Carr, Jr., in *Journal of Applied Physics*, Vol. 45, No. 2, in articles beginning on pages 929 and 935, published in 1974. In addition, over the last several years the manufactures of superconductors have further advanced the art in multi-filamentary superconductors to produce very fine filament, low-loss superconductors. The trend is continuing that commercially available superconductors may have filaments approaching about 1 micrometer in diameter. With such low-loss conductors, the possibility of new superconducting generator configurations becomes more realistic.

The above-mentioned Kirtley et al. patent represents an approach to superconducting rotors without continuous metallic shields but with fault worthiness intended to be provided by a wound damper shield winding that is located on the rotor between the field winding and the armature winding. The damper shield winding is located in the cold region of the machine and has electrically conducting leads to carry electric current from the cold region to a warm region. The leads are connected to electric current in response to voltages that appear between the leads as a consequence of transient conditions in the machine and to control the current that is thus caused to flow. The Kirtley et al. patent gives several examples of the nature of such current control circuitry.

In accordance with the present invention, a damper winding is locating inside of or among the turns of the field winding so that the field winding is more closely adjacent the air gap winding of the stator. This is contrary to the Kirtley et al. patent and also to straight-forward thinking with respect to having a damper shield winding that would be normally expected to be disposed over the element to be shielded, that is the D.C. field winding, and between that element and the other element, that is the armature winding, posing the threat to the protected element. Yet the present invention achieves both effective performance and greater power density.

The fact that the damper winding does not shield the field winding still achieves effective damping of low frequency (e.g. 2–4 Hz.) oscillations. Shielding for the purpose of preventing higher frequency (e.g. 60 Hz. or more) fields from affecting the field winding is not necessary where the field winding has low loss superconductors, such as those made up of filaments of superconductive material of about 0.1 micrometer or less in diameter. If the field winding is designed to include higher loss superconductors, such as to save cost, the arrangement preferably has a warm shield at the vacuum enclosure that is merely for shielding against high frequency flux. Such a shield may be a continuous metal shell, similar to that of U.S. Pat. No. 4,152,609, but the damper winding will be performing the damping function. The shield itself need not have the capacity to damp low frequency rotor oscillations.

Therefore, in summary, the present invention is directed to a superconducting dynamoelectric machine whose rotor has in addition to a superconducting D.C. field winding, a superconducting damper winding that is located within (that is, radially inside or on the same radius as) the field winding. The damper winding is also located on an orthogonal axis in relation to the field winding axis. That is, whereas the field winding is on a direct axis, the damper winding is on a quadrature axis. The damper winding is also connected to a warm region in which current control elements are provided. Such a current control element may be a simple resistor, although more complex arrangements may also be employed such as are presented in the current control circuitry of the Kirtley et al. patent. The result is a superconducting machine that is "shieldless" in the sense that it effectively operates without the need for continuous metallic damper shields.

DESCRIPTION OF THE PREFERRED EMBODIMENTS

Figure 1:
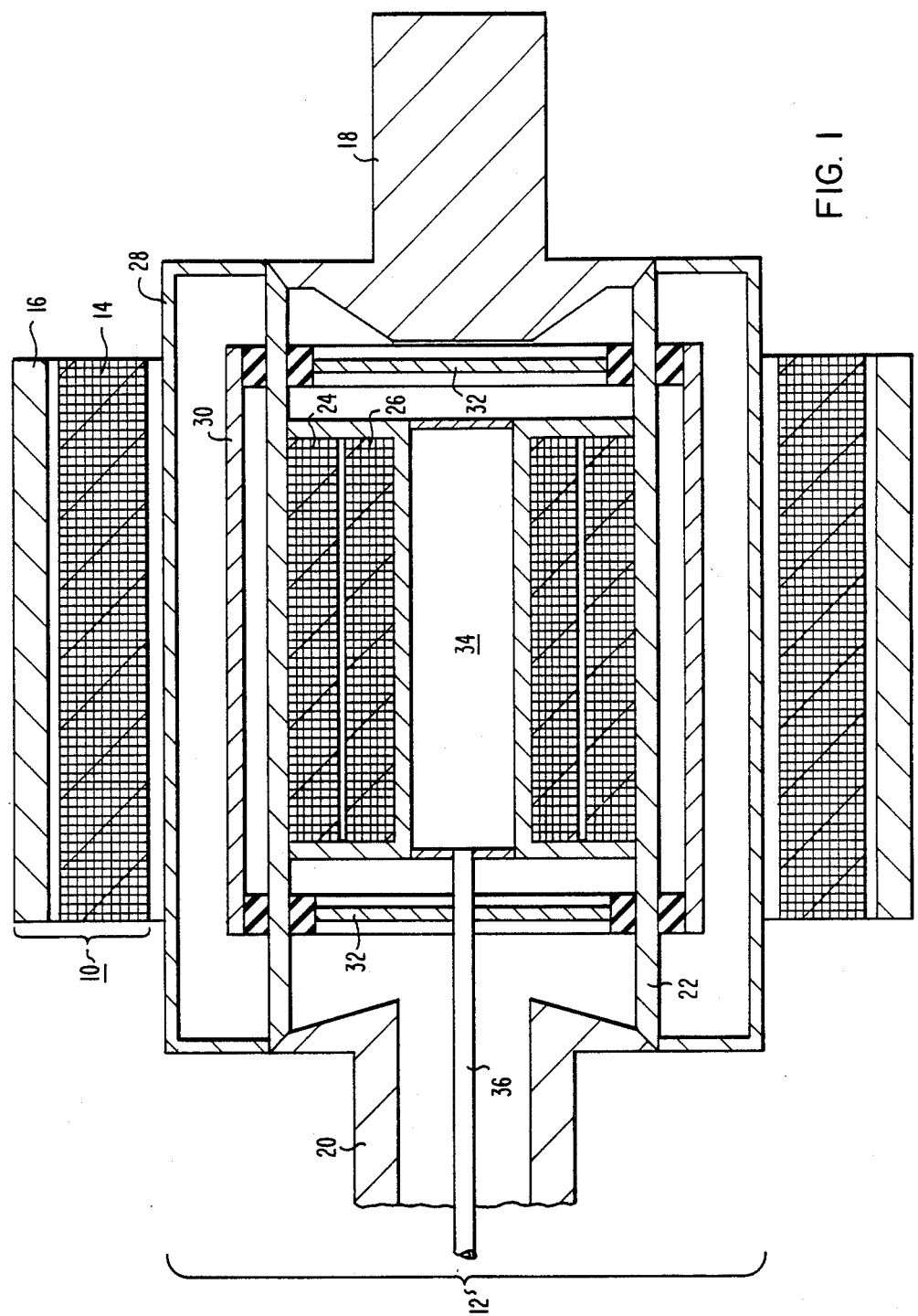
FIG. 1 is a side elevation view in cross-section of a superconducting generator in accordance with an embodiment of the present invention.

Referring to FIG. 1, an example of a superconducting generator in accordance with the present invention is illustrated which includes a stator 10 and a rotor 12 radially inside the stator. The stator 10 comprises a three-phase armature or stator winding 14 of the air gap type such as one configured in accordance with prior superconducting generator practice. The air gap winding 14 is mounted within an external magnetic or conducting flux shield 16 that may also be in accordance with usual practice. The stator winding 14 may be either normally conducting or superconducting.

The rotor 12 of the machine has general characteristics in accordance with prior practice with, however, the improvement of this invention. As has generally been the case, the rotor 12 has a drive shaft 18 at one end and an anti-drive shaft 20 at the other end. Between the two shaft ends 18 and 20 is a torque tube 22 within which the windings 24 and 26 of the rotor are contained. On the outside of the torque tube 22 is a vacuum containment shell or vacuum vessel 28 and also a radiation shield 30. Additional radiation shielding elements 32 are located axially of the windings 24 and 26. In the interior of the rotor 12, a helium reservoir 34 exists at the center that is supplied by a helium transfer tube 36 extending through the shaft 20.

In an alternative form, the vacuum vessel 28 can be part of the stationary structure and having shaft seals in contact with the rotor.

Contrary to the practice that has become essentially conventional in superconducting generator design, there are no metallic damper shields on the rotor between the vacuum vessel 28 and the rotor windings 24 and 26. Like the Kirtley et al. patent, the rotor windings include both a D.C. superconducting field winding 24 and a damper winding 26, but in direct contrast to the Kirtley et al. patent, the damper winding is located radially interior of the field winding and does not shield the ac fields at the field winding.

Figure 2:
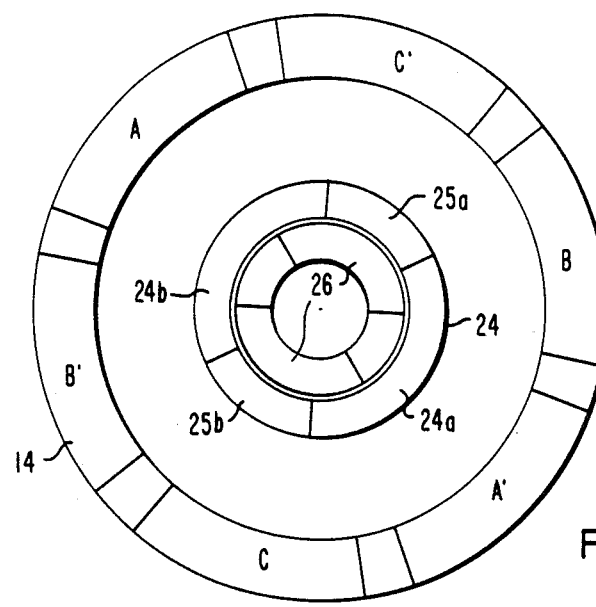
FIG. 2 is a cross-sectional view taken in a plane perpendicular to the axis of the windings of a superconducting generator in accordance with an embodiment of the invention.

The relation of the rotor windings 24 and 26 to each other and to the armature winding 14 can also be seen in FIG. 2. Here the representation is of a three-phase air gap type armature winding 14 of a normally conducting material such as copper. Winding 14 has phase windings A, C', B, A', C, B' in clockwise sequence as shown. A two-pole rotating field winding 24 is located on the rotor and a two-pole rotating damper winding 26 is located interior of the field winding. The damper winding 26 is on a quadrature axis in relation to the direct axis of the field winding 24. Both of the rotor windings 24 and 26 are superconducting and preferably provided by multi-filamentary monolithic or cabled superconductors which contain filaments of small diameter such as about 0.1 micrometer or less.

The rotor windings can be viewed in accordance with known practice to have greater numbers of poles, such as four, six or eight. In each such instance the damper winding is still disposed orthoganally to the field winding, that is, on a quadrature axis in relation to the direct axis of the field winding.

The view of FIG. 2 illustrates the damper winding 26 radially inside the field winding 24 with the two poles of the field winding shown at 24a and 24b and interpolar spaces at 25a and 25b. In an alternative form for faster damping and a more compact machine, the poles of the damper winding 26 can be fit within the interpolar spaces 25a and 25b of the field winding 24 (not shown in the drawing). Therefore, the general criterion for the location of the windings is that the field winding is on at least as large a radius as the damper winding. When that is done, the total radius of the rotor can be reduced.

Figure 3:
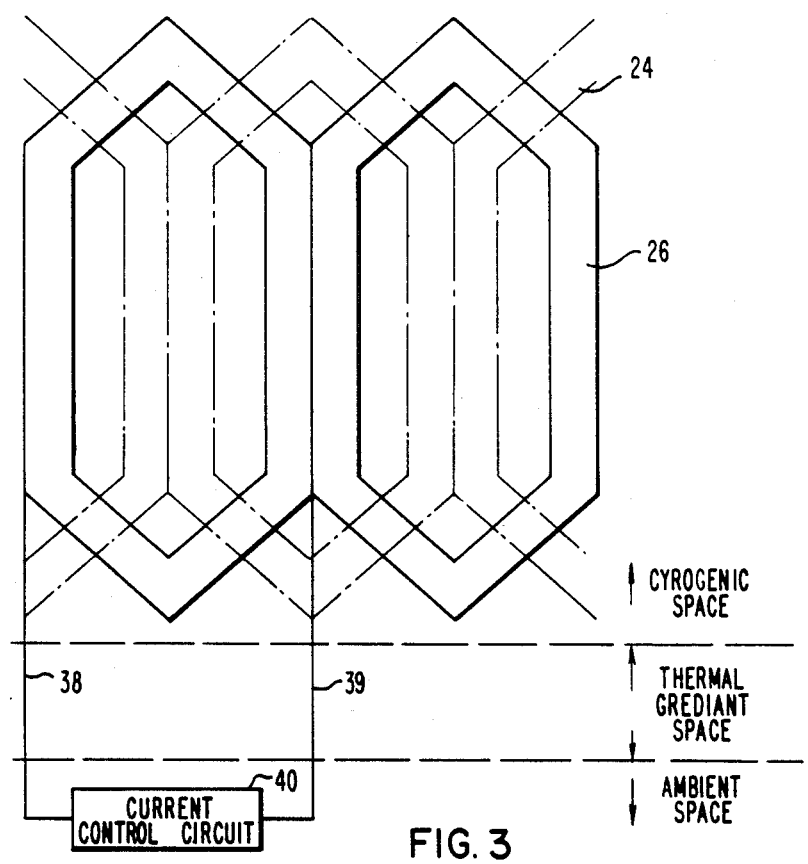
FIG. 3 is a partial view from the interior of a rotor showing part of the rotor windings.

A further illustration of the relation of the damper and field windings is provided by FIG. 3. It will be recognized that the illustration is substantially in accordance with that of FIG. 7 of the Kirtley et al. patent, with the significant exception that the view of FIG. 3 is looking from the inside of the rotor out so that it is seen that the damper shield winding 26 is in front of, that is radially within, the field winding 24, rather than in the reverse orientation as in Kirtley et al. FIG. 3 also shows, consistent with Kirtley et al., that the windings 24 and 26 are in the cryogenically cooled space of the machine. Leads 38 and 39 are connected to the damper winding 26 and extend out to an ambient temperature region where they are connected to a current control circuit 40, such as a resistor or other means as shown in Kirtley et al.

As compared to prior designs discussed above, the new design of this invention leads to a higher specific power, and lighter weight for the superconducting generator in that the field winding can be located more closely to the air gap armature winding as there is neither a metallic damper shield nor a damper winding between the field winding and the armature winding. As opposed to the previously patented arrangement, the present invention achieves fault worthiness to an extent greater than that if the damper winding is located radially outside the field winding.

It has, therefore, been shown that the shieldless, that is without metallic damper shields, superconducting generator is practical. The elimination of the need for electrical shields between the field winding and the armature winding avoids the need for the space of such elements in that location and thus enhances the power density of the machine. That is, the armature winding 14 and the shield 16 are located closer to the field winding 24. The increasing coupling results in lower reactances, including synchronous, transient and subtransient reactances. The reduction in reactances improves the critical fault clearing time of the superconducting generator. Also, the above changes result in a higher power density, i.e., smaller, more compact, machines for a given rating. Consequently, it is believed that the present invention provides a major design improvement in superconducting generators. Although presented in a few forms it will be understood it can be used in other forms consistent with the teachings hereof.

The damper winding 26 is not a shield against flux from the stator at 60 Hz. or more; its essential purpose is damping low frequency (e.g. 2-4 Hz.) oscillations which it can perform quite effectively. The shielding function for higher frequencies is made unnecessary by the use of low loss superconductors. If a lower cost design is desired, with less expensive superconductors, a shield can be incorporated in the vacuum enclosure 28, such as one comprising about one to two inches of a conductive shell such as of copper.

We claim:

1. A superconducting dynamoelectric machine comprising:

a stator having an armature winding;

a rotor having a superconducting field winding and also having a superconducting damper winding, said field winding being disposed at a location that is on at least as large a radius as said damper winding;

said damper winding being located on a quadrature axis in relation to a direct axis of said field winding and said damper winding having conducting leads extending into an ambient temperature region and connected there to means for controlling current in said damper winding.

2. A superconducting dynamoelectric machine in accordance with claim 1 wherein:

said field winding and said damper winding are comprised of multi-filamentary superconductors having small filament diameters of about 0.1 micrometer or less.

3. A superconducting dynamoelectric machine in accordance with claim 1 wherein:

said rotor field winding is radially outside said damper winding.

4. A superconducting dynamoelectric machine in accordance with claim 1 wherein:

said damper winding is located at the same radius as said field winding and is within the poles of said field winding.

* * * * *